United States Patent
Nachum

(12) United States Patent (10) Patent No.: US 11,018,935 B1
(45) Date of Patent: May 25, 2021

(54) NETWORK TRAFFIC QUALITY-BASED DYNAMIC PATH CHANGE

(71) Applicant: Marvell Israel (M.I.S.L) Ltd, Yokneam (IL)

(72) Inventor: Gai Nachum, Rishon Le Zion (IL)

(73) Assignee: MARVELL ASIA PTE LTD, Singapore (SG)

( * ) Notice: Subject to any disclaimer, the term of this patent is extended or adjusted under 35 U.S.C. 154(b) by 328 days.

(21) Appl. No.: 14/274,722

(22) Filed: May 11, 2014

Related U.S. Application Data

(60) Provisional application No. 61/821,958, filed on May 10, 2013.

(51) Int. Cl.
*H04L 12/24* (2006.01)

(52) U.S. Cl.
CPC .......... *H04L 41/0826* (2013.01); *H04L 41/12* (2013.01)

(58) Field of Classification Search
CPC .......................... H04L 41/0826; H04L 41/12
USPC ....................................................... 370/256
See application file for complete search history.

(56) References Cited

U.S. PATENT DOCUMENTS

| | | | | |
|---|---|---|---|---|
| 6,330,229 B1 * | 12/2001 | Jain | ..................... | H04L 12/4625 370/256 |
| 6,335,927 B1 * | 1/2002 | Elliott | ..................... | H04L 12/14 370/352 |
| 6,678,241 B1 * | 1/2004 | Gai | ..................... | H04L 12/2419 370/216 |
| 8,144,629 B2 * | 3/2012 | Chamas | .............. | H04L 12/4675 370/232 |
| 2002/0046271 A1 * | 4/2002 | Huang | ................... | H04L 45/00 709/223 |
| 2003/0016624 A1 * | 1/2003 | Bare | ....................... | H04L 61/10 370/217 |
| 2003/0142685 A1 * | 7/2003 | Bare | ................... | H04L 67/1002 370/410 |
| 2006/0002408 A1 * | 1/2006 | Ould-Brahim | ...... | H04L 43/0811 370/406 |
| 2006/0280131 A1 * | 12/2006 | Rahman | ................. | H04L 45/02 370/256 |
| 2008/0205402 A1 | 8/2008 | McGee et al. | | |
| 2008/0212487 A1 * | 9/2008 | Silvestri | ................ | H04L 69/16 370/253 |

(Continued)

OTHER PUBLICATIONS

Spanning tree protocol Configuration, Cisco (Year: 2007).*
IEEE Std 802.1D™—2004, "IEEE Standard for Local and metropolitan area networks Media Access Control (MAC) Bridges", 281 pages, Jun. 9, 2004.
IEEE Std 802.1Q™—2005, "IEEE Standard for Local and metropolitan area networks Virtual Bridged Local Area Networks", 303 pages, May 19, 2006.

(Continued)

*Primary Examiner* — Kibrom T Hailu
*Assistant Examiner* — Nizam U Ahmed

(57) ABSTRACT

Network apparatus includes a plurality of ports for connection to respective links in a packet communication network, the ports having respective port costs assigned thereto. One or more packet processors are configured to transfer data packets between the ports. A controller is configured to select, using a spanning tree protocol responsively to the port costs, one of the ports as a root port, thereby defining a forwarding topology, to receive data with respect to a quality of packet transmission through the ports over the respective links according to the defined topology, and responsively to a change in the packet transmission quality indicated by the received data, to modify a cost of at least one of the ports so as to cause a modification of the forwarding topology by the spanning tree protocol.

17 Claims, 2 Drawing Sheets

(56) References Cited

U.S. PATENT DOCUMENTS

| | | | |
|---|---|---|---|
| 2010/0046524 A1 | 2/2010 | Rune et al. | |
| 2010/0085878 A1* | 4/2010 | McDade | H04L 41/0631 370/242 |
| 2012/0240017 A1* | 9/2012 | Uchida | H04L 49/1515 714/821 |
| 2013/0077567 A1* | 3/2013 | Fujita | H04W 48/17 370/328 |
| 2013/0108259 A1* | 5/2013 | Srinivas | H04Q 3/0083 398/25 |
| 2013/0163422 A1* | 6/2013 | Isobe | H04L 69/162 370/230.1 |
| 2013/0343229 A1* | 12/2013 | Gasparakis | H04L 45/66 370/256 |
| 2014/0043977 A1* | 2/2014 | Wiley | H04M 7/006 370/235 |
| 2014/0279785 A1* | 9/2014 | Prieditis | G06Q 10/00 706/46 |
| 2015/0207720 A1* | 7/2015 | Dagum | H04L 41/32 370/252 |
| 2015/0207724 A1* | 7/2015 | Choudhury | H04L 45/026 370/255 |

OTHER PUBLICATIONS

McCloghrie et al., "Management Information Base for Network Management of TCP/IP-based internets", Internet Engineering Task Force (IETF) RFC 1156, 91 pages, May 1990.

McCloghrie et al., "Management Information Base for Network Management of TCP/IP-based internets: MIB-II", Internet Engineering Task Force (IETF) RFC 1213, 70 pages, Mar. 1991.

Routhier, S., "Management Information Base for the Internet Protocol (IP)", Internet Engineering Task Force (IETF) RFC 4293, 122 pages, Apr. 2006.

Perlman et al., "Routing Bridges (RBridges): Base Protocol Specification", Internet Engineering Task Force (IETF) RFC 6325, 99 pages, Jul. 2011.

Eastlake et al., "Routing Bridges (RBridges): Adjacency", Internet Engineering Task Force (IETF) RFC 6327, 26 pages, Jul. 2011.

Perlman et al., "Routing Bridges (RBridges): Appointed Forwarders", Internet Engineering Task Force (IETF) RFC 6439, 15 pages, Nov. 2011.

Cisco Systems, Inc., "Measuring Delay, Jitter, and Packet Loss with Cisco IOS SAA and RTTMON", Document ID: 24121, 8 pages, Oct. 25, 2005.

* cited by examiner

NETWORK TRAFFIC QUALITY-BASED DYNAMIC PATH CHANGE

CROSS-REFERENCE TO RELATED APPLICATION

This application claims the benefit of U.S. Provisional Patent Application 61/821,958, filed May 10, 2013, which is incorporated herein by reference.

FIELD OF THE DISCLOSURE

The present disclosure relates generally to communication networks, and particularly to methods and apparatus for defining and updating the active topology in a packet switch network.

BACKGROUND

The Spanning Tree Protocol (STP), defined in IEEE Standard 802.1D, is a network protocol that may be used to ensure a loop-free active topology in a bridged local area network (LAN). As the protocol scans over the nodes of a bridged network, it creates a tree of connections among the nodes, while disabling links that are not part of the tree, to generate only a single active path between any two nodes. Although the term "bridge" is used in the IEEE standard, Layer-2 switches play the part of the bridges in nearly all modern LANs, and the terms "bridge" and "switch" are therefore used interchangeably.

SUMMARY

Embodiments that are described hereinbelow provide apparatus and methods that can be used in enhancing selection of packet transmission paths in a network.

There is therefore provided, in accordance with an embodiment, network apparatus, including a plurality of ports for connection to respective links in a packet communication network, the ports having respective port costs assigned thereto, and one or more packet processors, which are configured to transfer data packets between the ports. A controller is configured to select, using a spanning tree protocol responsively to the port costs, one of the ports as a root port, thereby defining a forwarding topology, to receive data with respect to a quality of packet transmission through the ports over the respective links according to the defined topology, and responsively to a change in the packet transmission quality indicated by the received data, to modify a cost of at least one of the ports so as to cause a modification of the forwarding topology by the spanning tree protocol.

Typically, the controller is configured to detect the change on a link connected to any port of the apparatus that is not disabled.

In some embodiments, the data received by the controller include respective counts of packet errors detected by the ports, wherein the controller is configured to detect the change responsively to the respective counts. In an embodiment, the counts are indicative of numbers of dropped packets. Additionally or alternatively, the counts are indicative of packet latencies.

Further additionally or alternatively, the data received by the controller include respective counts of packet retransmissions through the ports, wherein the controller is configured to detect the change responsively to the respective counts. In an embodiment, the controller is configured to count the packet retransmissions by analyzing transport control protocol communications conveyed through the ports.

Typically, the controller is configured to increase the cost of the at least one of the ports when the received data indicate that the packet transmission quality has deteriorated.

There is also provided, in accordance with an embodiment, a method for communication, which includes assigning respective port costs to a plurality of ports of a network device that are connected to respective links in a packet communication network. Using a spanning tree protocol responsively to the port costs, one of the ports is selected as a root port, thereby defining a forwarding topology over the network. Data are received with respect to a quality of packet transmission through the ports over the respective links according to the defined topology. Responsively to a change in the packet transmission quality indicated by the received data, a cost of at least one of the ports is modified so as to cause a modification of the forwarding topology by the spanning tree protocol.

The present embodiments will be more fully understood from the following detailed description of the embodiments thereof, taken together with the drawings in which:

DETAILED DESCRIPTION OF EMBODIMENTS

Figure 1:
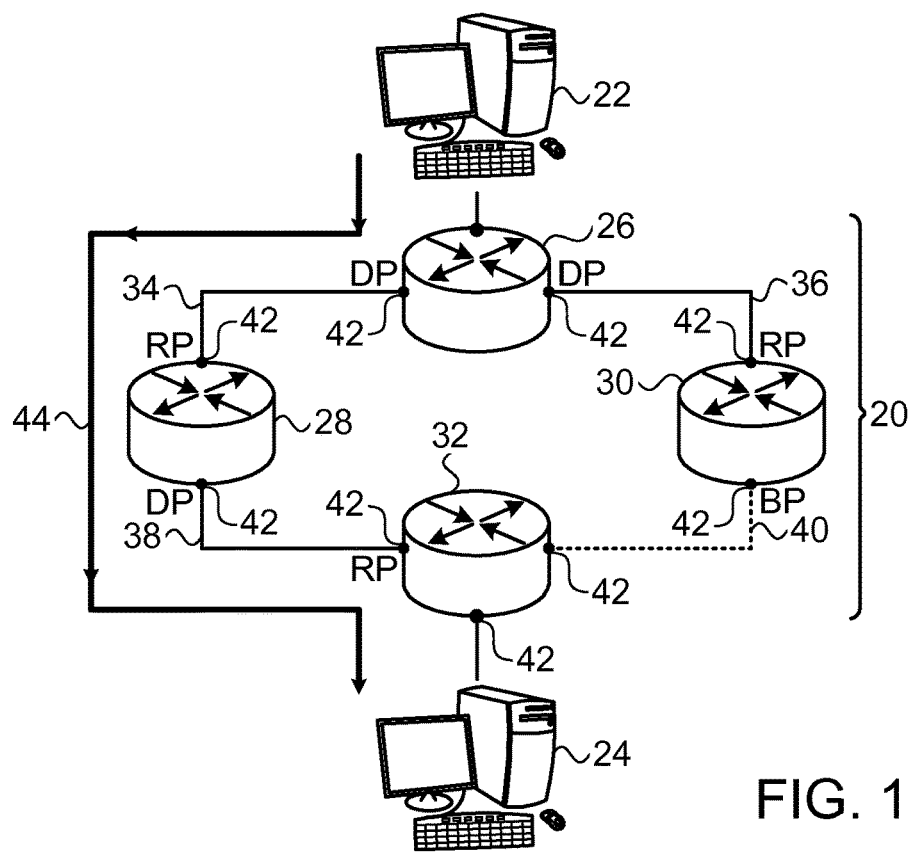
FIGS. 1 and 2 are block diagrams that schematically illustrate a packet communication network before and after a change in active topology of the network, in accordance with an embodiment of the present disclosure.

When STP runs in a bridged network, one of the bridges is selected as the root bridge. A cost is assigned to each of the links in the network (typically as a function of designated link speed), and the bridges exchange topology information, including costs, by transmitting and receiving bridge protocol data unit (BPDU) frames. Based on the link costs, each bridge computes the cost of each possible path from itself to the root and chooses the least-cost path. The port of a bridge that connects the bridge to its least-cost path is referred to as the root port (RP), while any other port of the bridge that is connected by a link to the root port of another segment of the network is the designated port (DP) for that segment. Ports that are neither RPs nor DPs are blocked in order to prevent loop formation. When the network topology changes, due to failure of a link or switch for example, the bridges use a predefined set of messages to update the active spanning tree topology accordingly.

A number of variations on and improvements of the original Spanning Tree Protocol have been developed and standardized, such as the Rapid Spanning Tree Protocol (RSTP, incorporated in IEEE standard 802.1D-2004) and the Multiple Spanning Tree Protocol (MSTP, described in IEEE standard 802.1Q-2005). References to a spanning tree protocol in the present patent application and in the claims should be understood to include all such variants, unless specifically stated otherwise.

Layer-2 networks (such as Ethernet networks) commonly use protection schemes in order to ensure network service that is robust against faults, such as link failures. Typically, operations, administration and management (OAM) tools detect faults and, when an active link in the network is found to be faulty, shut down the faulty link and replace it with a backup link. In many cases, however, a link whose quality has deteriorated may still be functional. It would be advantageous, from the point of view of network management, to continue using the link, possibly at a reduced priority, as provided by an embodiment described herein.

Embodiments that are described herein provide methods and apparatus that are capable of detecting changes in link quality and modifying the forwarding topology of the network (also referred to as the active topology) in order to account for such link quality changes. In these embodiments, network elements, such as switches, use passive monitoring techniques to detect link quality changes, and use existing active topology protocols, such as a spanning tree protocol (STP), to implement topology modifications accordingly. The monitoring is "passive" in the sense that the network elements need not transmit or receive special quality monitoring packets, but simply derive a measure of link quality from statistics of, and/or other information corresponding to, communication packets that are transmitted and received. Therefore, these embodiments may be applied to improve network performance without requiring substantial changes to the hardware, software, or protocols used by participating network elements.

In a disclosed embodiment, network apparatus, such as a switch or other bridge in a Layer-2 network, comprises multiple ports, which are connected to respective links in a packet communication network. One or more packet processors in the apparatus, such as a switching core, transfer data packets between the ports. Initial costs are assigned to the ports, based on link speed, for example. A controller of the apparatus applies the port costs in selecting, using a spanning tree protocol (STP), one of the ports as a root port, and thus defines an initial forwarding topology (also referred to as the active topology) of the network.

During operation of the network, the controller receives data with respect to the quality of packet transmission through the ports over the respective links according to the defined topology. When the received data indicates to the controller that there has been a change in the packet transmission quality on a given link, the controller modifies the cost that is assigned to at least one of the ports (such as the root port of the switch or the designated port that is connected to the link, or any other port that is not disabled). Consequently, when the switches in the network next run STP, the forwarding topology is likely to be modified as a result of the increased cost, in an embodiment. Thus, for example, the controller increases the costs of links whose quality has deteriorated, with the result that these links are disabled or carry a reduced volume of traffic. On the other hand, in some embodiments, when a link continues to carry traffic after such a cost increase, and the quality of the link improves, the controller reduces the corresponding cost.

Although the embodiments described herein make use of the features of the STP family of protocols, the principles of these embodiments may similarly be applied using other active topology protocols for Layer-2 networks, such as TRILL (described in IETF RFCs 6325, 6327 and 6439), for example. Furthermore, the principles of these embodiments may be adapted, mutatis mutandis, for use in conjunction with Layer-3 routing protocols, such as the Open Shortest Path First (OSPF) protocol, which similarly uses link costs in choosing routing paths through an IP network.

Some of the disclosed embodiments make use of a management information base (MIB), which is a database that is used in managing the entities in a network, and in particular for collecting information from network entities (such as switches) in a standardized format. Most modern network switches collect, maintain and transmit MIB data in accordance with applicable protocols, such as the Simple Network Management Protocol (SNMP). Common MIB data structures (referred to as "objects") are defined, for example, in Request for Comments (RFC) 1156 of the Internet Engineering Task Force (IETF), by McCloghrie et al., entitled "Management Information Base for Network Management of TCP/IP-based internets" (1990), as well as in RFC 1213 (1991) and RFC 4293 (2006). The MIB data structures include counters relating to switch and network performance, such as the following:

ifInDiscards—The number of inbound packets that were chosen to be discarded even though no errors had been detected to prevent their being deliverable to a higher-layer.

ifInErrors—The number of inbound packets that contained errors preventing them from being deliverable to a higher-layer protocol.

ifOutDiscards—The number of outbound packets that were chosen to be discarded even though no errors had been detected to prevent their being transmitted.

ifOutErrors—The number of outbound packets that could not be transmitted because of errors.

Switches are commonly designed to collect and report this sort of information individually for each of the ports of the switch.

Figure 2:
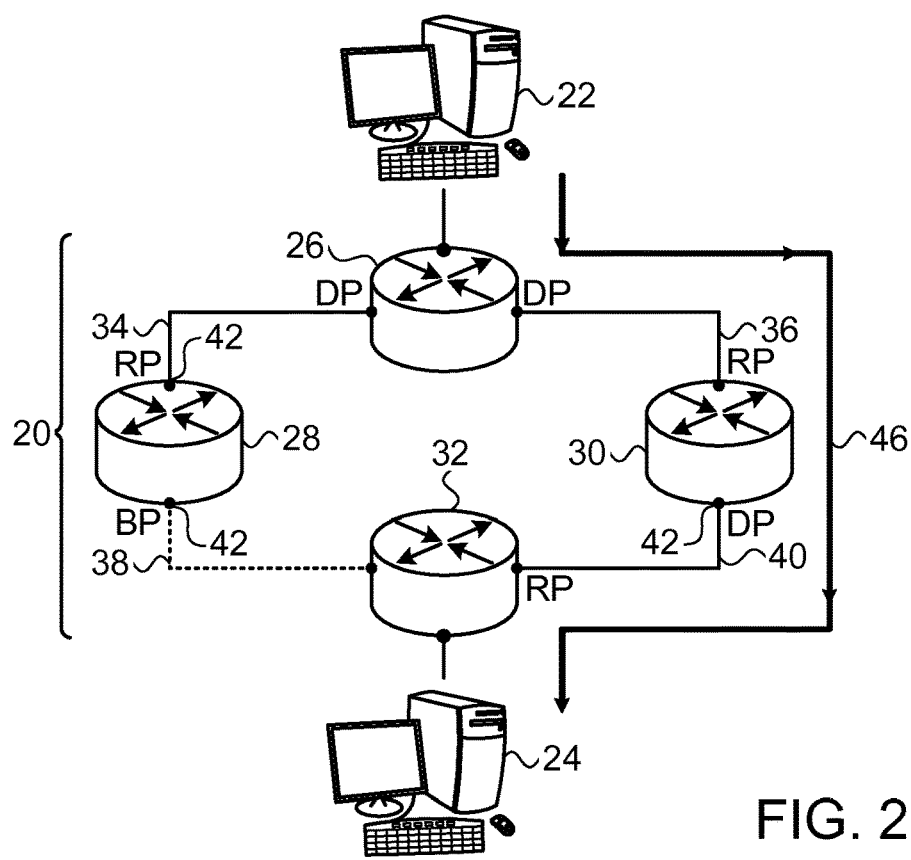

FIGS. 1 and 2 are block diagrams that schematically illustrate a packet communication network 20 before (FIG. 1) and after (FIG. 2) a change in active topology of the network, in accordance with an embodiment of the present disclosure. Network 20 is assumed to be a Layer-2 network, such as an Ethernet network, running STP to determine its active topology; but the principles of the disclosed embodiments may similarly be implemented in networks of other types, as noted above.

Network 20 comprises switches 26, 28, 30 and 32, having ports 42, which are interconnected by links 34, 36, 38, 40. In this example, it is assumed that running STP over network 20, as is known in the art, causes switch 26 to be chosen as the root switch. Ports 42 connecting switch 26 to links 34 and 36 are configured as designated ports (DP), while the corresponding ports of switches 28 and 30 become the root ports (RP) for these switches. Based on initial costs or other considerations, link 38 is chosen to be the active link between switches 28 and 32, while link 40 is disabled, as indicated by the dotted line in FIG. 1. Consequently, ports 42 of switches 30 and 32 that connect to link 40 become blocked ports (BP). A path 44 between endpoints 22 and 24 thus runs initially through switches 26, 28 and 32.

In the scenario illustrated in FIGS. 1 and 2, switch 28 and/or switch 32 detects a deterioration in the quality of link 38 in the course of operation of network 20. There are a variety of ways in which this quality degradation can be detected passively. For example, the switch controllers may periodically monitor counts of packet errors detected by ports 42 and stored by the MIB counters in the switch, and may decide that a deterioration has occurred when the number of errors per unit time has exceeded a preset threshold. The counts that are monitored in this manner may be the numbers of incoming and/or outgoing packets that are dropped or undeliverable, such as the MIB counter values described above in the Background section. Alternatively or additionally, the switch controller may collect and process counts that are indicative of packet latencies, such as the count of the Round Trip Time Monitor (RTTMON) MIB that is provided by Cisco IOS® software. As long as the errors or latency values are below the threshold, the switch controller makes no change in the port costs.

If and when any of the relevant counts exceed the threshold, the switch controller increases an applicable link cost, such as the cost assigned to the root port or the designated port on the link in question, or any other appropriate active port of the switch. For example, the switch controller may double the current port cost, or it may increase the port cost in proportion to the number of errors detected per unit time and/or to the length of time over which the error count has been above the threshold. If the switch controller monitors counts of multiple different indicators for each link, each indicator may make its own contribution to the assigned cost. In a typical implementation, the switch (such as switch 32 in the example shown in FIG. 1) increases the cost associated with the current root port sufficiently to cause an alternate link (such as link 40 in the example shown in FIGS. 1 and 2) to be activated the next time STP runs over the network.

Additionally or alternatively, the switch controller may count events associated with higher-level protocols as an indicator of link quality deterioration. For example, deterioration of link quality often leads to an increase in the need for packet retransmission by higher-level protocols, such as the Transport Control Protocol (TCP). The switch controller may thus count retransmission requests, and increase the port cost when the number of such requests per unit time exceeds a preset threshold. For this purpose, the controller may monitor TCP communications conveyed through ports 42 in order to detect and count retransmit requests or to estimate the frequency of occurrence of such retransmissions by checking packet serial numbers in TCP acknowledgment packets, for example.

In the scenario shown in FIG. 2, switches 26, 28, 30, 32 have rerun STP after increasing the cost of link 38. In consequence, link 38 has been deactivated, as shown by the dotted line in the figure, and ports 42 on link 38 have been blocked. Instead, link 40 is now the active link to the root port of switch 32, and endpoints 22 and 24 are connected by an alternate path 46 running through switches 26, 30 and 32.

Although the example embodiments that are shown and described here relate to increasing port costs in response to deterioration of link quality, the cost may subsequently be decreased when the link quality is found to have improved. As long as the link remains active, the quality improvement will be detected automatically by means of the techniques described herein. Alternatively or additionally, blocked links may be actively tested in order to determine whether a cost reduction is called for.

Figure 3:
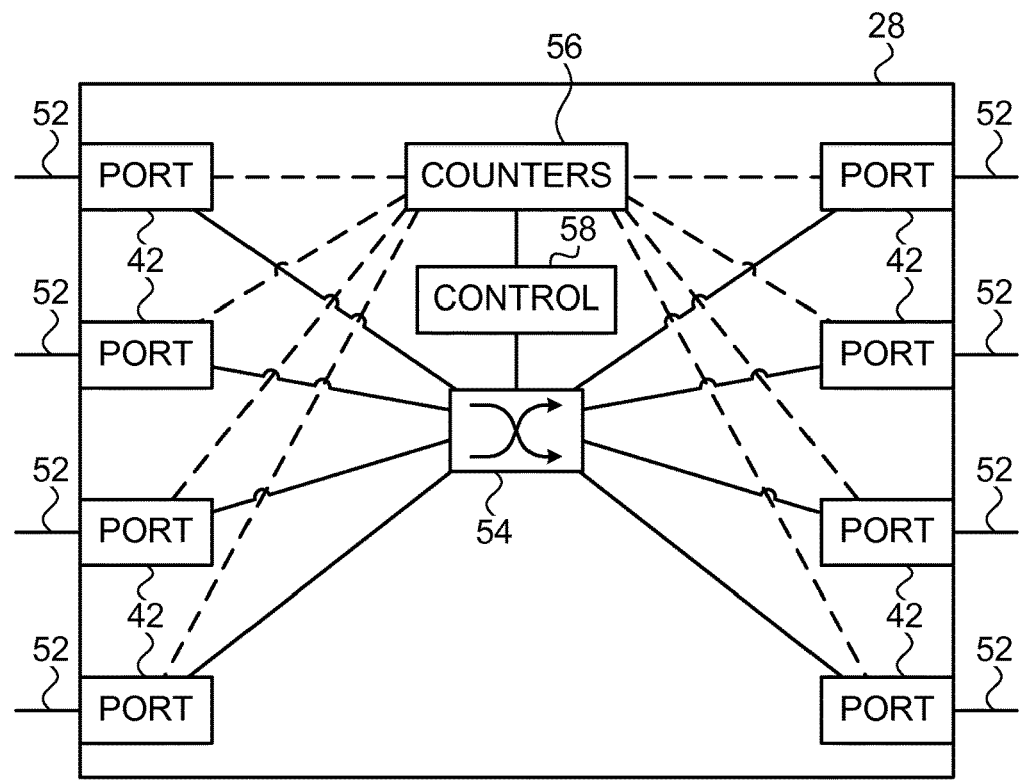
FIG. 3 is a block diagram that schematically illustrates a network switch that may be used in the network of FIGS. 1 and 2, in accordance with an embodiment of the present disclosure.

FIG. 3 is a block diagram that schematically shows details of a network switch, such as switch 28, in accordance with an embodiment of the present disclosure. As noted above, switch 28 comprises multiple ports 42, which are connected to respective links 52 in the network. A switching core 54 transfers data packets between ports 42. In the course of operation, ports 42 count packet statistics, such as the counts of dropped and erroneous packets that are mandated by standard MIBs, as described above. Ports 42 record these counts in MIB counters 56, which typically comprise memory registers that maintain records of the counts so that the count values can be accessed for purposes of network management and maintenance.

A controller 58, such as an embedded microprocessor, manages the operation of switch 28, including configuring the port costs and participating, together with the other switches in network 20, in defining the active topology of the network. Specifically, in the context of the present embodiments, the controller reads the relevant values of counters 56 and updates the port costs as appropriate. Upon finding that a given link counter has exceeded the threshold for quality degradation, controller 58 updates the corresponding port cost (or costs) and send a BPDU frame via the network to inform the other switches, in an embodiment.

Figure 4:
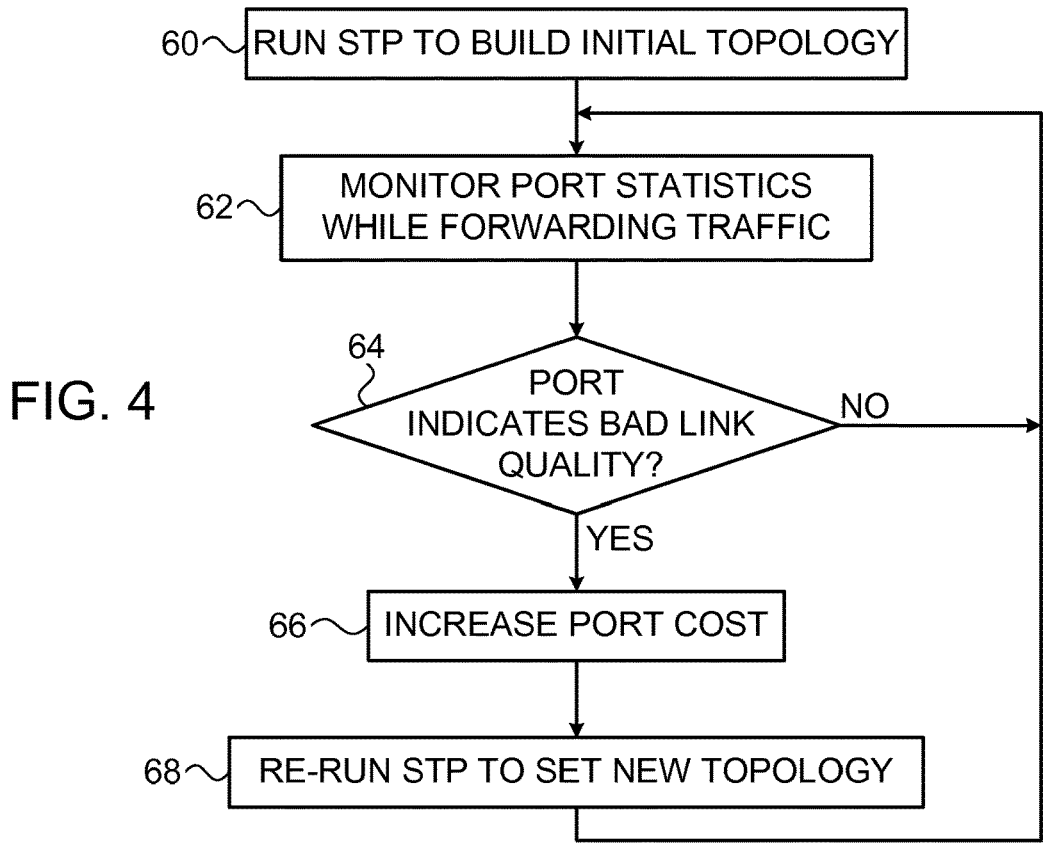
FIG. 4 is a flow chart that schematically illustrates a method for setting and updating an active topology of a packet network, such as the network of FIGS. 1 and 2, in accordance with an embodiment of the present disclosure.

FIG. 4 is a flow chart that schematically illustrates a method for setting and updating an active topology in network 20, in accordance with an embodiment of the present disclosure. At start-up of network operation, initial port costs of switches 26, 28, 30, 32 are set, typically based on (but not limited to) the corresponding link speeds, and possibly based on other configuration parameters established by the network operator. The switches run STP, as is known in the art, in order to build the initial active (forwarding) topology of the network, at an initial topology building operation 60. The result may be, for example, the active topology that is shown in FIG. 1.

Switches 26, 28, 30, 32 forward traffic over the active topology, and in the meanwhile, ports 42 collect packet statistics in counters 56, at a statistics monitoring operation 62. Controller 58 monitors these statistics, as explained above, in order to detect link quality deterioration. For example, the controller reads the error count Y reported by a given port every X seconds (in a non-limiting example, once every eight seconds) and compares the result to a preset threshold value, at a link evaluation operation 64. Optionally, the controller may read a vector of multiple counts, each count associated with a different quality measure, and may apply the same or different thresholds to each count. As long as the error counts are no greater than the applicable thresholds, the controller makes no change in the port costs, and monitoring continues at operation 62.

On the other hand, upon discovering that the error count in a given time interval has exceeded the applicable threshold, controller 58 increases the cost associated with at least one of ports 42, at a cost increase operation 66. For example, as noted earlier, in an embodiment the controller increases the port cost of the root port that is connected to the link in question; but additionally or alternatively, the costs associated with other active ports are increased. Any suitable formula may be used to compute the cost increase that is to be applied. For example, assuming the initial link cost was set in the standard way, according to link speed, the controller increases the cost by X % (i.e., 1% times the number of seconds, X, in the monitoring interval) for each interval in which the error count exceeded the threshold. The switches inform one another of changes in port costs by exchanging appropriate BPDU frames in an embodiment.

In an embodiment, STP is rerun by switches 26, 28, 30, 32 in an automated manner from time to time, or when prompted by a change in network conditions, at a topology modification operation 68. Alternatively or additionally, STP is rerun based on an instruction from a network administrator. For example, one of the switches invokes operation 68 after changing the cost associated with one of its ports. Depending on the degree of change in the port cost and the availability of alternative paths, the new topology resulting from operation 68 may be the same as or different from the previous topology. The process of quality monitoring and topology updates continues thereafter at operation 62.

It is noted that the embodiments described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A layer-2 network switch, comprising: a plurality of ports for connection to respective links in a layer-2 packet communication network, the ports having respective port costs assigned thereto; one or more packet processors, which are configured to transfer layer-2 data packets between the ports; and a controller, located on the layer-2 network switch, the controller being configured: to select, using a spanning tree protocol responsively to the port costs, one of the ports as a root port, thereby defining a forwarding topology, to receive data with respect to a quality of packet transmission through the ports over the respective links according to the defined topology, to estimate for at least a port among the ports, based on the received data, a change in a number of Transport Control Protocol (TCP) Retransmissions passing via the port per unit time, by checking TCP acknowledgment packets passing via the port, to modify a cost of the port, responsively to the estimated change, and to inform other layer-2 network switches in the packet communication network of the modified cost, so as to cause a modification of the forwarding topology by the spanning tree protocol to disable or to reduce a volume of traffic carried by ports having an increased cost.

2. The network switch according to claim 1, wherein the controller is configured to estimate the change on a link connected to any port of the network switch that is not disabled.

3. The network switch according to claim 1, wherein the controller is configured to count the packet retransmissions by analyzing TCP communications conveyed through the ports.

4. The network switch according to claim 1, wherein the controller is configured to increase the cost of the port when the received data indicate that the packet transmission quality has deteriorated.

5. The network switch according to claim 1, wherein the controller is configured to modify the cost responsively to a change in a number of inbound packets that contain errors preventing the packets from being deliverable to a higher-layer protocol.

6. The network switch according to claim 1, wherein the controller is configured to modify the cost responsively to a change in a number of outbound packets that could not be transmitted because of errors.

7. The network switch according to claim 1, wherein the controller is configured to estimate the change in the number of TCP retransmissions by checking packet serial numbers in the TCP acknowledgment packets.

8. A method for communication, comprising, using a controller located on a layer-2 network switch: assigning respective port costs to a plurality of ports of the layer-2 network switch that are connected to respective links in a layer-2 packet communication network; selecting, using a spanning tree protocol responsively to the port costs, one of the ports as a root port, thereby defining a forwarding topology over the network; receiving data with respect to a quality of packet transmission through the ports over the respective links according to the defined topology; estimating for at least one port among the ports, based on the received data, a change in a number of Transport Control Protocol (TCP) Retransmissions passing via the port per unit time, by checking TCP acknowledgment packets passing via the port; responsively to the estimated change, modifying a cost of the port; and informing other layer-2 network switches in the packet communication network of the modified cost, so as to cause a modification of the forwarding topology by the spanning tree protocol to disable or to reduce a volume of traffic carried by ports having an increased cost.

9. The method according to claim 8, wherein estimating the change comprises detecting the change on a link connected to any of the ports that is not disabled according to the defined topology.

10. The method according to claim 8, wherein receiving the respective counts comprises analyzing TCP communications conveyed through the ports to detect the packet retransmissions.

11. The method according to claim 8, wherein modifying the cost comprises increasing the cost of the port when the received data indicate that the packet transmission quality has deteriorated.

12. The method according to claim 11, wherein increasing the cost comprises increasing the cost in proportion to a number of packets per unit time that contain errors.

13. The method according to claim 11, wherein increasing the cost comprises increasing the cost in proportion to a length of time over which an error count is above an error threshold.

14. The method according to claim 8, wherein modifying the cost comprises modifying the cost responsively to a change in a number of inbound packets that contain errors preventing the packets from being deliverable to a higher-layer protocol.

15. The method according to claim 8, wherein modifying the cost comprises modifying the cost responsively to a change in a number of outbound packets that could not be transmitted because of errors.

16. The network switch according to claim 8, wherein the controller is configured to increase the cost in proportion to a number of packets per unit time that contain errors.

17. The method according to claim 8, wherein estimating the change in the number of TCP retransmissions comprises checking packet serial numbers in the TCP acknowledgment packets.

* * * * *